Feb. 29, 1944. R. D. PIKE 2,343,080
PRODUCTION OF CARBONATES
Filed April 17, 1941
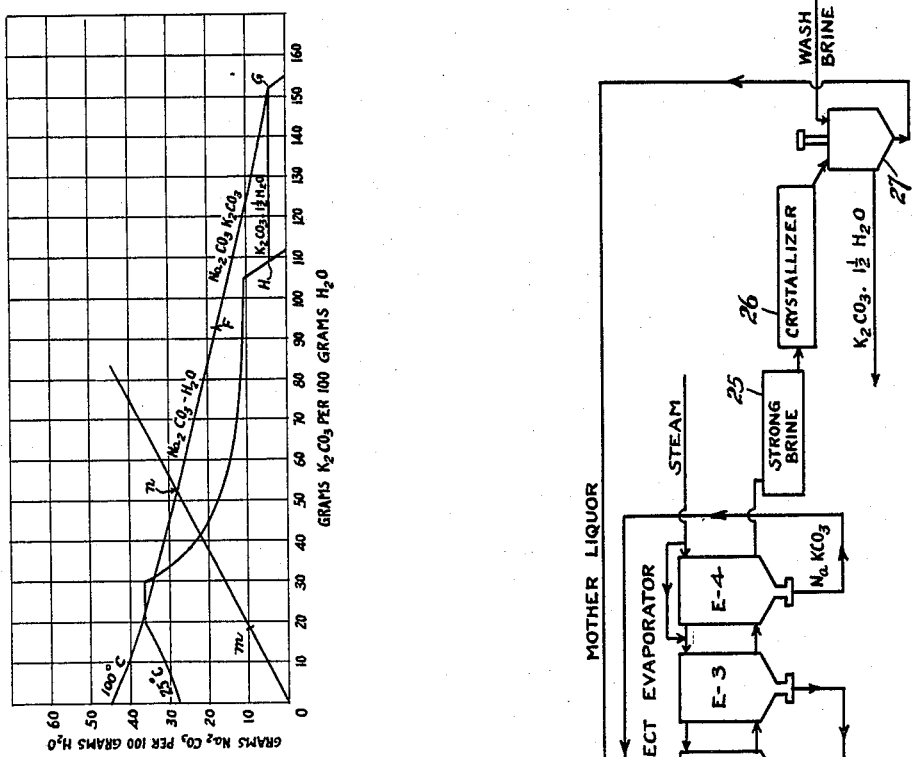
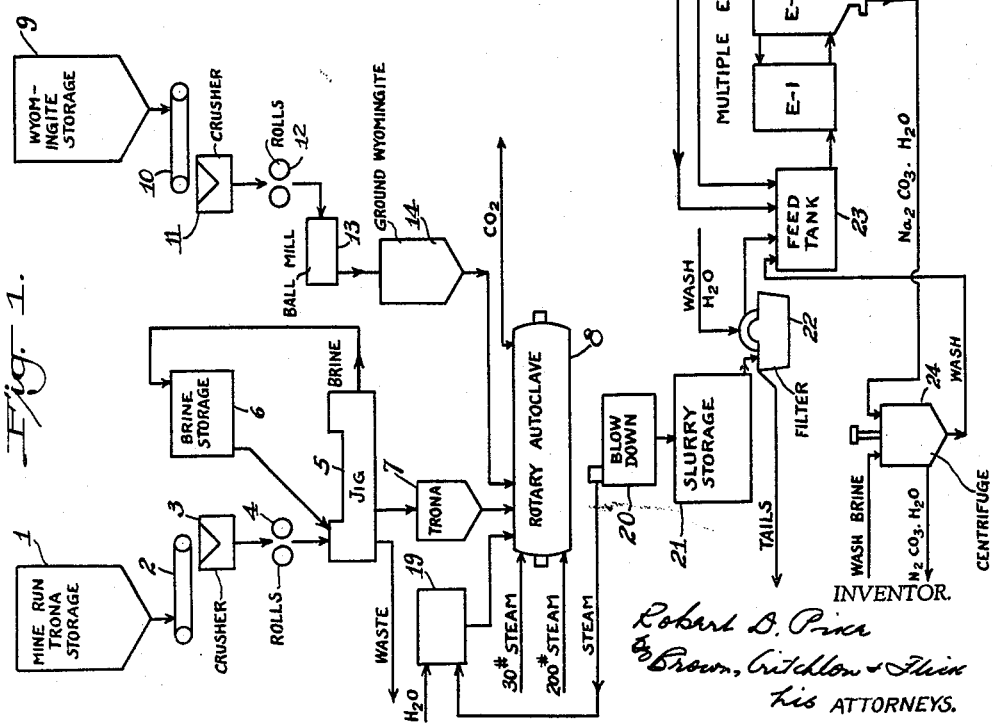
INVENTOR.
Robert D. Pike
By Brown, Critchlow & Flick
his ATTORNEYS.

Patented Feb. 29, 1944

2,343,080

UNITED STATES PATENT OFFICE 2,343,080

PRODUCTION OF CARBONATES

Robert D. Pike, Pittsburgh, Pa.

Application April 17, 1941, Serial No. 388,951

3 Claims. (Cl. 23—63)

This invention relates to the production of sodium and potassium carbonates.

A primary object of the invention is to provide a simple, inexpensive, easily operable and efficient process for producing commercially pure sodium and potassium carbonates from natural materials, rocks or minerals.

A further object is to provide such a process in which use is made of trona and potassium silicate base exchange minerals, particularly leucite-containing rocks and especially Wyomingite, for producing sodium carbonate monohydrate and potassium carbonate sesquihydrate.

Still another object is to provide a process for producing in substantially pure form the aforesaid hydrated carbonates from the system $Na_2CO_3$, $K_2CO_3$, $H_2O$.

The invention will be described with reference to the accompanying drawing in which Fig. 1 is a flow sheet illustrative of the process, and Fig. 2 is a solubility diagram of the usual type for the system, sodium carbonate—potassium carbonate—water showing the solubility relationships for the 25° C. and the 100° C. isotherms. In Fig. 2 the data for the 25° C. isotherm are taken from the work by Hill and Miller, Journal of the American Chemical Society, volume 49, pages 669–686, and the data for the 100° C. isotherm were developed in the course of my work, while the line $mn$ is an assumed position used hereinafter in describing the process of the present invention.

In the State of Wyoming there are extensive deposits of a rock called "Wyomingite," a typical analysis of which is as follows:

| | Per cent |
|---|---|
| $K_2O$ | 11.48 |
| $Na_2O$ | 1.32 |
| $SiO_2$ | 51.7 |
| $Al_2O_3$ | 13.05 |
| $Fe_2O_3$ | 4.20 |
| $FeO$ | 1.28 |
| $CaO$ | 6.80 |
| $MgO$ | 7.60 |
| $P_2O_5$ | 2.75 |
| | 100.18 |

Approximately one-half of Wyomingite consists of the mineral leucite ($K_2O.Al_2O_3.4SiO_2$), which is one of the so-called base exchange minerals. Due to this property about 8 pounds of $K_2O$ per 100 pounds of Wyomingite is available for base exchange with sodium.

Not far from the Wyomingite deposits are large beds of almost pure trona ($Na_2CO_3.NaHCO_3.2H_2O$), a typical analysis of which is as follows:

| | Per cent |
|---|---|
| $Na_2CO_3$ | 49.29 |
| $NaHCO_3$ | 33.18 |
| $H_2O$ | 17.07 |
| Water insoluble | 0.30 |
| | 99.84 |

I have discovered, and it is upon this that the present invention is in part predicated, that the stated objects of the invention are attained by treatment of trona to decompose its bicarbonate content and produce a solution of sodium carbonate with which Wyomingite or similar rock or mineral is treated to effect base exchange of the potassium of the Wyomingite and produce potassium carbonate which dissolves, as it is formed, in the sodium carbonate liquor. I have discovered further that by appropriate treatment it is possible readily to recover therefrom the two carbonates separately and in commercially pure form.

Although in the practice of the invention trona may be heated to decompose the sodium bicarbonate present in the rock, and the Wyomingite then treated separately with a solution of the resultant sodium carbonate, it is now preferred to effect the decomposition in a suitable reaction vessel which is initially charged with raw trona, Wyomingite and water so that the Wyomingite base exchange reaction then follows without interruption. For optimum efficiency a considerable excess of sodium carbonate is present because this assists in recovering the maximum amount of the available potassium content of the Wyomingite.

The reactions involved are as follows:

Trona decomposition:

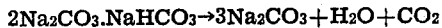

$2Na_2CO_3.NaHCO_3 \rightarrow 3Na_2CO_3 + H_2O + CO_2$

Base exchange:

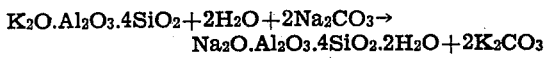

$K_2O.Al_2O_3.4SiO_2 + 2H_2O + 2Na_2CO_3 \rightarrow$
$Na_2O.Al_2O_3.4SiO_2.2H_2O + 2K_2CO_3$ After the base exchange reaction has been completed the solution is separated from insoluble matter and is then subjected to concentration by evaporation, preferably in a multiple effect evaporator. I have discovered that in this manner the solution of mixed carbonates may be concentrated to a point where sodium carbonate monohydrate ($Na_2CO_3.H_2O$) will be salted out in substantially pure form. By further concentration there is then crystallized an amount of the mixed, or sodium potassium, carbonate ($NaKCO_3$) up to the point wher pure potassium carbonate sesquihydrate ($K_2CO_3.1\frac{1}{2}H_2O$) may be recovered by cooling the mother liquor. The sodium and potassium carbonates are recovered for use, while preferably the sodium potassium carbonate is returned to the evaporator feed.

The invention may be described further with respect to its preferred practice as illustrated in the accompanying flow sheet, Fig. 1. Trona as mined, may carry some amount of shale which desirably is removed prior to the base exchange reaction. In this embodiment, mine run trona from storage 1 is passed by a conveyor 2 to a crusher 3 from which it goes to rolls 4 to reduce it to convenient size for treatment on a jig 5 where the trona is separated from shale and accompanying inert matter by a circulating brine supplied from a storage container 6. This brine is one which does not dissolve or alter the trona; it may conveniently be a water solution of about 26.1 per cent of sodium carbonate and 1.2 per cent of sodium bicarbonate, although as will be understood other brines are available which will be stable in the sense that they do not dissolve any substantial amount of trona. The tailings, consisting largely of shale, are discarded, the brine is returned to storage 6, and the pure trona is then passed to a storage bin 7 from which suitable amounts are introduced into a reaction vessel 8, preferably a rotary autoclave. Where the shale content is low jigging may be omitted, the crushed run of mine trona being fed directly to autoclave 8.

Wyomingite is passed from storage 9 by a conveyor 10 to a crusher 11, then reducing rolls 12, and finally to a ball mill 13. The exact degree of sub-division of the Wyomingite seems to be not critical, and I have found that satisfactory results may be obtained if it is reduced to pass a 14-mesh sieve. However, the base exchange reaction is accelerated by finer sub-division, e. g., so that substantially all of it will pass a 20-mesh sieve. The ground Wyomingite passes to a storage bin 14 from which weighed amounts are introduced into autoclave 8.

Water, preferably heated, is passed from a heater tank 19 into the autoclave together with the trona and Wyomingite.

The autoclave having been charged and closed, steam at relatively low pressure, for example about 30 pounds per square inch gauge pressure, is introduced to decompose the sodium bicarbonate contained in the trona, the carbon dioxide produced being released during this operation. When the trona has been completely decomposed high pressure steam, for example at about 200 pounds gauge pressure, is turned into the autoclave to effect the base exchange reaction between the available potassium of the Wyomingite and the sodium of the sodium carbonate solution produced from the trona.

After the completion of the base exchange reaction the contents of the autoclave may be discharged into a blow-down tank 20 where the pressure is released. Or, pressure is released by direct bleeding of steam from the autoclave. The steam resulting from this operation may be passed to heater tank 19 to heat the water supplied to the autoclave. The brine may then be passed to a storage container 21 and thence to a filter 22.

The filter cake of insoluble residue, largely sodium leucite with other inert, insoluble material, is discarded as tailings. The clear brine, containing sodium and potassium carbonates, together with a portion, say the first half, of the wash water is then passed to an evaporator feed tank 23 from which the raw brine is supplied to a multiple effect evaporator which in the embodiment shown comprises four effects E—1, E—2, E—3 and E—4. The raw brine enters the first effect, E—1, and passes through the second, third and fourth effects, E—2, E—3 and E—4, successively, in countercurrent flow to the vapor through the four effects. Low pressure steam at, for example, 20 to 30 pounds gauge pressure, is introduced into effects E—3 and E—4.

The progress of the individual stages of the concentration process involved may be described most simply with reference to Fig. 2. Assuming that the raw brine from feed tank 23 is of the composition represented by the point $m$, the brine composition will change along line $mn$ as evaporation proceeds in effect E—1. When the composition is that of point $n$ sodium carbonate monohydrate will begin to crystallize. Usually it will be desirable to pass the concentrated brine from E—1 before the sodium carbonate is salted out, this crystallization being then accomplished in effects E—2 and E—3. Sodium carbonate monohydrate will crystallize out along line NF until the composition is that of point F, when the double salt ($NaKCO_3$) begins to be salted out. In practice, therefore, crystallization of sodium carbonate monohydrate in effect E—3 will be stopped somewhat before point F is reached to avoid possible contamination of the sodium carbonate by potassium of the double salt.

The sodium carbonate monohydrate from effects E—2 and E—3 is passed to a centrifuge 24 where it is washed, most suitably with a saturated brine of sodium carbonate, thus producing the monohydrate in a form which is suited for conversion into a pure grade of soda ash. The liquor removed from the monohydrate in centrifuge 24 is passed together with the wash brine to feed tank 23.

From effect E—3 the first mother liquor passes to effect E—4 in which further evaporation is effected to cause crystallization of the sodium potassium carbonate along line FG, Fig. 2. The double salt which crystallizes in this effect is preferably dewatered, by means not shown, and is also passed to feed tank 23.

At point G both sodium potassium carbonate and potassium carbonate would be salted out on further evaporation. At this point, or at a point short of G but such that cooling will cause the liquor to meet the $K_2CO_3$ line at 25° C., the mother liquor is withdrawn from effect E—4 for crystallization. It may be passed to a storage tank 25 from which it is introduced into a crystallizer 26 where it is cooled to 25° C., whereupon potassium carbonate sesquihydrate crystallizes along the line GH. The slurry from crystallizer 26 is passed to a centrifuge 27 to recover the solid salt, the final mother liquor being returned to feed tank 23.

A sesquicarbonate sufficiently pure for ordinary commercial use can be produced in this manner by merely dewatering it in centrifuge 27 without washing. However, if the cake be washed with a saturated solution of potassium carbonate the solid salt will be practically pure.

In the production of one ton of $K_2O$ in the form of potassium carbonate sesquicarbonate from the Wyomingite and trona of the foregoing analyses there would be charged into the autoclave 5.9 tons of trona, 13.9 tons of Wyomingite, and 19.5 tons of hot water. About 2.8 tons of sodium carbonate monohydrate would be salted out in effects E—3 and E—4, which would produce about 2.4 tons of pure soda ash. In effects E—1, E—2 and E—3 there would be evaporated about 32.5 tons of water. In effect E—4 about 2.74 tons of the sodium potassium carbonate double salt would be crystallized while evaporating approximately four tons of water. From centrifuge 27 there would be recovered about 1.76 tons of potassium carbonate sesquihydrate for direct use, and the final mother liquor would consist of 3.4 tons of water with 3.73 tons of $K_2CO_3$ in solution. In the operation described, in which the filter and centrifuge washes together with the double sodium potassium carbonate are returned to the evaporated feed tank, the composition of the raw brine supplied to effect E—1 would be approximately as follows:

|  | Tons per ton $K_2O$ | Grams per 100 gm. $H_2O$ |
|---|---|---|
| $K_2CO_3$ | 6.75 | 18.35 |
| $Na_2CO_3$ | 3.71 | 10.10 |
| $H_2O$ | 38.00 |  |

The invention has been described in detail with reference to its application to Wyomingite, partly because deposits of that rock and of high grade trona are located quite close together in Wyoming, so that considerable economic advantage would attend its use, particularly because coal and natural gas are available there also. It will be understood, however, that trona may be used in the manner described for treating other rocks containing potassium silicate base exchange minerals or leucite.

According to the provisions of the patent statutes, I have explained the principle and method of practicing my invention and have illustrated and described what I now consider to represent its best embodiment. However, I desire to have it understood that, within the scope of the appended claims, the invention may be practiced otherwise than as specifically illustrated and described.

I claim:

1. That method of producing sodium and potassium carbonates from a potassium silicate base exchange mineral which comprises treating said mineral, sodium carbonate and water in a closed container under steam pressure to effect base exchange between the sodium of said carbonate and the potassium of said mineral and form a brine containing sodium and potassium carbonates, separating the resultant brine from solid matter and evaporating it to crystallize out, successively, sodium carbonate and sodium potassium carbonate, recovering said carbonates separately, and then cooling the mother liquor to crystallize out potassium carbonate sesquihydrate, and recovering the said sesquihydrate.

2. That method of producing potassium carbonate from a potassium silicate base-exchange mineral which comprises treating Wyomingite, sodium carbonate and water in a closed container under steam pressure to effect base exchange between the sodium of said carbonate and the available potassium of said mineral and form a brine containing sodium and potassium carbonates, the amount of sodium carbonate being substantially in excess of that theoretically necessary to supply sodium for said base exchange, separating the resultant brine from solid matter and evaporating it in an evaporator to crystallize out, successively, sodium carbonate and sodium potassium carbonate, recovering said carbonates separately, then cooling the mother liquor to crystallize out potassium carbonate sesquihydrate, recovering the said sesquihydrate, and returning said sodium potassium carbonate and the final mother liquor to the evaporator.

3. A process for producing sodium carbonate and potassium carbonate from the system $Na_2CO_3$, $K_2CO_3$, $H_2O$ which comprises evaporating and crystallizing sodium carbonate, then sodium potassium carbonate, then cooling and crystallizing potassium carbonate, and recirculating said sodium potassium carbonate and the mother liquor from said potassium carbonate crystallization to the evaporator.

ROBERT D. PIKE.

CERTIFICATE OF CORRECTION.

Patent No. 2,343,080. February 29, 1944.

ROBERT D. PIKE.

It is hereby certified that error appears in the printed specification of the above numbered patent requiring correction as follows: Page 3, second column, line 21, claim 2, for "Wyomingite" read --a potassium silicate base exchange mineral--; and that the said Letters Patent should be read with this correction therein that the same may conform to the record of the case in the Patent Office.

Signed and sealed this 16th day of May, A. D. 1944.

(Seal)

Leslie Frazer
Acting Commissioner of Patents.